(12) United States Patent
Suh et al.

(10) Patent No.: US 11,603,149 B2
(45) Date of Patent: Mar. 14, 2023

(54) VEHICLES AND SYSTEMS AND COMPONENTS THEREOF

(71) Applicants: Hyundai Motor Company, Seoul (KR); Kia Motors Corporation, Seoul (KR)

(72) Inventors: John Suh, Palo Alto, CA (US); Youngbin Min, Gyeonggi-do (KR); Grey Parker, West Bloomfield, MI (US); Prasanna Natarajan, Aldie, VA (US); Josiah LaColla, Farmington Hills, MI (US); David Byron, Southfield, MI (US); Lisa Savage, Wixom, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 403 days.

(21) Appl. No.: 16/734,310

(22) Filed: Jan. 4, 2020

(65) Prior Publication Data
US 2020/0216127 A1 Jul. 9, 2020

Related U.S. Application Data

(60) Provisional application No. 62/788,862, filed on Jan. 6, 2019, provisional application No. 62/788,402, filed on Jan. 4, 2019.

(51) Int. Cl.
| | |
|---|---|
| B62D 57/028 | (2006.01) |
| B60K 7/00 | (2006.01) |
| B25J 18/02 | (2006.01) |
| B25J 17/00 | (2006.01) |

(52) U.S. Cl.
CPC ............ *B62D 57/028* (2013.01); *B25J 17/00* (2013.01); *B25J 18/02* (2013.01); *B60K 7/0007* (2013.01); *B60K 2007/0092* (2013.01)

(58) Field of Classification Search
CPC .............. B62D 57/028; B60G 2202/43; B60G 2204/46; B60G 2204/47
See application file for complete search history.

(56) References Cited

U.S. PATENT DOCUMENTS

| | | | | |
|---|---|---|---|---|
| 4,265,326 A | * | 5/1981 | Lauber ................. | B62D 57/028 180/8.3 |
| 8,030,873 B2 | | 10/2011 | Wilson et al. | |
| 9,359,028 B2 | * | 6/2016 | Jun ....................... | B62D 57/032 |

(Continued)

FOREIGN PATENT DOCUMENTS

| | | | | |
|---|---|---|---|---|
| WO | WO-2007081452 A1 | * | 7/2007 | ............. B60G 3/185 |
| WO | WO-2015145710 A1 | * | 10/2015 | ........... B62D 57/028 |
| WO | WO-2016119068 A1 | * | 8/2016 | ............ B60F 3/0007 |

OTHER PUBLICATIONS

"Wilcox et al., Athlete A cargo handling and manipulation robot for the moon, 2007, Wiley Periodicals Inc., Journal of Field Robotics 24(5), 421-434" (Year: 2007).*

*Primary Examiner* — Jacob D Knutson
*Assistant Examiner* — Ryan Edward Hardy
(74) *Attorney, Agent, or Firm* — Fox Rothschild LLP

(57) ABSTRACT

New mobility components are provided that can enable a vehicle to traverse difficult terrain. In a particular aspect, vehicle leg components are provided that utilize unique degrees of freedom that can facilitate mobility. In a further aspect, vehicles are provided that contain such components.

13 Claims, 11 Drawing Sheets

(56) References Cited

U.S. PATENT DOCUMENTS

| | | | |
|---|---|---|---|
| 2003/0208303 A1* | 11/2003 | Okamoto | B62D 57/028 |
| | | | 700/245 |
| 2019/0302775 A1* | 10/2019 | Palan | B62B 5/02 |
| 2020/0180168 A1* | 6/2020 | Han | B25J 13/089 |
| 2020/0354003 A1* | 11/2020 | Ishikawa | B60G 17/0162 |

* cited by examiner

VEHICLES AND SYSTEMS AND COMPONENTS THEREOF

CROSS-REFERENCE TO RELATED APPLICATIONS

This application claims priority to U.S. Provisional Application No. 62/788,402, filed on Jan. 4, 2019 and U.S. Provisional Application No. 62/788,862 filed on Jan. 6, 2019. The entire contents of the aforementioned patent applications are incorporated herein by this reference.

FIELD

In one aspect, new components are provided that enable a vehicle to traverse varied terrain. In a particular aspect, vehicle leg components are provided that utilize unique degrees of freedom to facilitate mobility. In a further aspect, vehicles are provided to transition between driving and walking modes.

BACKGROUND

Certain efforts have been made to enable a vehicle to traverse terrain difficult with a standard vehicle. In particular, efforts to develop the All-Terrain Hex-Limbed Extra-Terrestrial Explorer, so-called ATHLETE, have been reported. The ATHLETE is a six-legged robotic lunar rover system and is not suited for individual use. See also U.S. Pat. No. 8,030,873.

Other attempts to address difficult terrain have included certain personal mobility vehicles (PMVs) such the powered wheelchair TopChair that can traverse a stairway. However, such personal devices have clear limits including restricted range and capacity.

It thus would be desirable to have new vehicle and systems that could enable or facilitate mobility over difficult terrain.

SUMMARY

We now provide new vehicle components and vehicles that contain such components that can traverse difficult terrain.

In particular, a vehicle traversal component is provided that includes a leg structure and can enable a vehicle to operate in either a roll or driving state or alternatively step or walk state.

In particular aspects, a vehicle traversal component suitably may comprise (a) a wheel unit with multiple degrees of freedom; and (b) a leg unit with multiple degrees of freedom. Such extended movement facilitates the ability of a present vehicle to traverse in either a roll or walk manner.

Preferred leg units include those that have at least four degrees of freedom. In one system, a leg unit suitably comprises a hip housing; at least two leg links; and a wheel rotation and steering housing. In certain preferred systems, the degrees of freedom of the leg unit include hip abduction, hip extension, knee extension and ankle extension. The degrees of freedom of a wheel unit may suitably include wheel steering and wheel rotation.

Preferred leg units comprise a first leg unit and a second leg unit. In certain configurations, one or both of the first leg unit and second leg unit are curved. In particular aspects, the first and second leg units are each curved in opposed respective directions.

In certain preferred vehicle traversal components wherein the first and second leg units nest together in a retracted configuration. Additionally, in a retracted configuration, the first and second leg units suitably may at least partially surround a wheel unit.

In a particularly preferred aspect, a leg unit suitably comprises two elongated leg portions that each have a first end and second end. The first ends of each of the first leg portion and second leg portion mate or join to form a knee portion that can hinge or otherwise rotate around the first ends joining to provide a range of the first and second leg portions in a retracted state (for example, where the first and second leg portions are folded or lie over each other along a horizontal axis in a stowed configuration) to where the first and second leg portions are in an actuated state and the leg portions each extend longitudinally along a vertical axis to thereby elevate a vehicle comprising such leg units.

A second end of the first leg portion suitably may mate with a hip unit of a vehicle traversal component. The first leg portion second end may suitably rotate and be hinged with the hip portion to provide another degree of freedom. In a retracted state, the first and second leg portions suitably may nest within or around the hip portion. In an actuated state, the first leg portion may extend vertically from the hip portion.

A second end of the second leg portion suitably may mate with a wheel unit. The mating of the second leg portion and wheel component may form a hinged or otherwise rotatable ankle unit. The wheel unit includes a wheel and suitably further includes steering housing. Preferably, the wheel can rotate laterally to provide for an additional degree of freedom.

A vehicle suitably includes a plurality of vehicle traversal components, particularly four, six, eight or more traversal components. Significantly, preferred vehicles have the ability to drive in the same manner that a standard passenger vehicle drives in the same type of environments, for example, highways, side roads, etc.

In use, a vehicle can operate alternatively between roll (drive) and walk motions or states. Thus, in preferred systems, the vehicle traversal components nest in a retracted configuration in a driving state of the vehicle. Those traversal components can extend in an actuated configuration to facilitate a walking motion or state.

In certain preferred systems, one or more of the degrees of freedom of a vehicle traversal component is driven by a direct current motor. In certain preferred systems, a wheel hub motor may be utilized, for example installed at an inner surface of wheel unit of a traversal component.

Preferred vehicles include those where the height of the vehicle is adjustable, for example to accommodate the height of terrain on which the vehicle is being driven, or to provide access to an elevated position or location. For instance, the vehicle height is suitably adjusted (elevated) when a knee extension motor is engaged with one of the at least two leg links.

One or more leg units of a vehicle may be actuated to raise the height of the vehicle to provide access of vehicle passengers to elevated positions such as the top of stairway. Such access can be particularly beneficial for instance in emergency situations or for persons with limited mobility such as an injured, disabled or elderly persons.

In further preferred vehicles, a receiver may be utilized and suitably mounted within the wheel rotation and steering housing, preferably together with a latch that engages with the receiver to engage a passive suspension connected to a chassis of the vehicle.

Other aspects of the invention are discussed infra.

DETAILED DESCRIPTION

Figure 1:
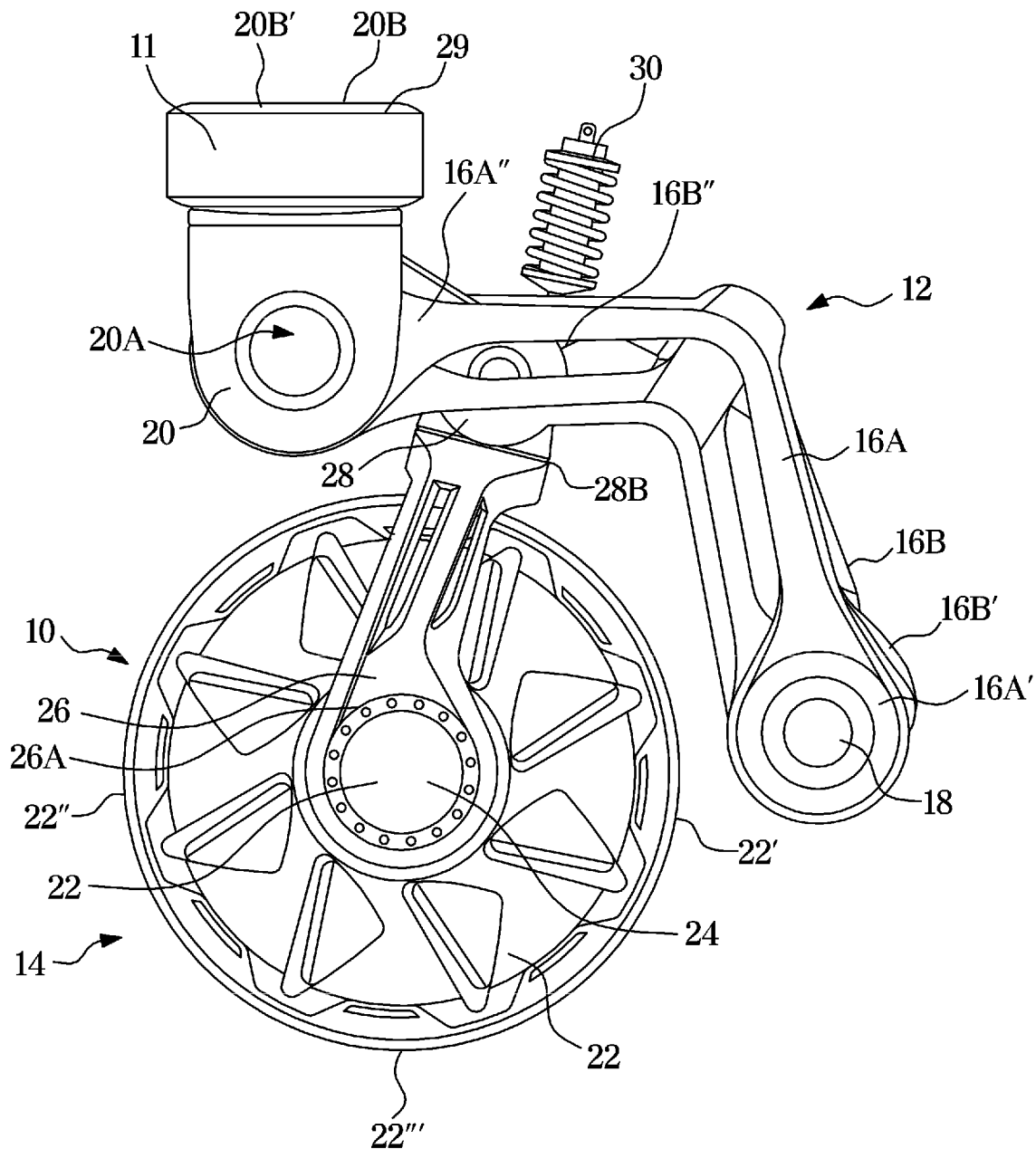
FIG. 1 shows a side view of a preferred vehicle traversal component in a retracted or stowed configuration.

As discussed, new vehicle traversal components and vehicles that comprise one or more of such components are provided. In preferred aspects, a vehicle traversal component suitably may comprise (a) a wheel unit with multiple degrees of freedom; and (b) a leg unit with multiple degrees of freedom.

In one aspect, vehicles are provided that comprise a plurality of vehicle traversal components and where the vehicles raises or lowers vertically to transition between driving and walking states. For instance, the vertical plane (e.g. along a chassis line) of the vehicle may rise up to or more than 0.1, 0.2, 0.3, 0.4, 0.5, 0.6, 0.7, 0.8, 0.9, 1.0, 1.2, 1.4. 1.6, 1.8 or 2.0 meters to transition from a driving state (rolling wheels suitably with leg portions not extended)) to a walking state (one or more vertically extended leg portions moving). Similarly, the vertical plane (e.g. along a chassis line) of the vehicle may lower up to or more than 0.1, 0.2, 0.3, 0.4, 0.5, 0.6, 0.7, 0.8, 0.9, 1.0, 1.2, 1.4. 1.6, 1.8 or 2.0 meters to transition from a walking state (one or more vertically extended leg portions moving such as around a hip joint portion and/or knee joint portion and/or ankle joint portion) to a driving state (rolling wheels suitably with leg portions not extended or with leg portions not moving around a hip joint and/or knee joint portion and/or ankle joint portion).

In a preferred aspect, a vehicle is provided that comprises a plurality of vehicle traversal components, wherein a height of the vehicle is adjustable based on extension of the leg unit of the traversal component. The traversal component preferably has multiple degrees of freedom, and may comprise (a) a wheel unit with multiple degrees of freedom; and (b) a leg unit with multiple degrees of freedom.

In certain preferred vehicles, the vehicles are capable of traversing (e.g. stepping) over a gap that is up to or more than 0.5, 1, 1.5, 2 2.5 or 3 meters wide, or climbing stairs or a wall that is up to or more than 0.5, 1, 1.5, 2 2.5 or 3 meters in height.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Accordingly, while exemplary embodiments of the disclosure are capable of being variously modified and taking alternative forms, exemplary embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" or "joined" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. Wherever possible, the same reference numbers will be used throughout the drawings to refer to the same or like parts. Various exemplary embodiments are described more fully with reference to the accompanying drawings, in which only some exemplary embodiments are shown. Specific structural and functional details disclosed herein are merely representative for the purpose of describing exemplary embodiments. The present disclosure, however, may be embodied in many alternate forms and should not be construed as being limited only to the exemplary embodiments set forth herein.

Figure 2:
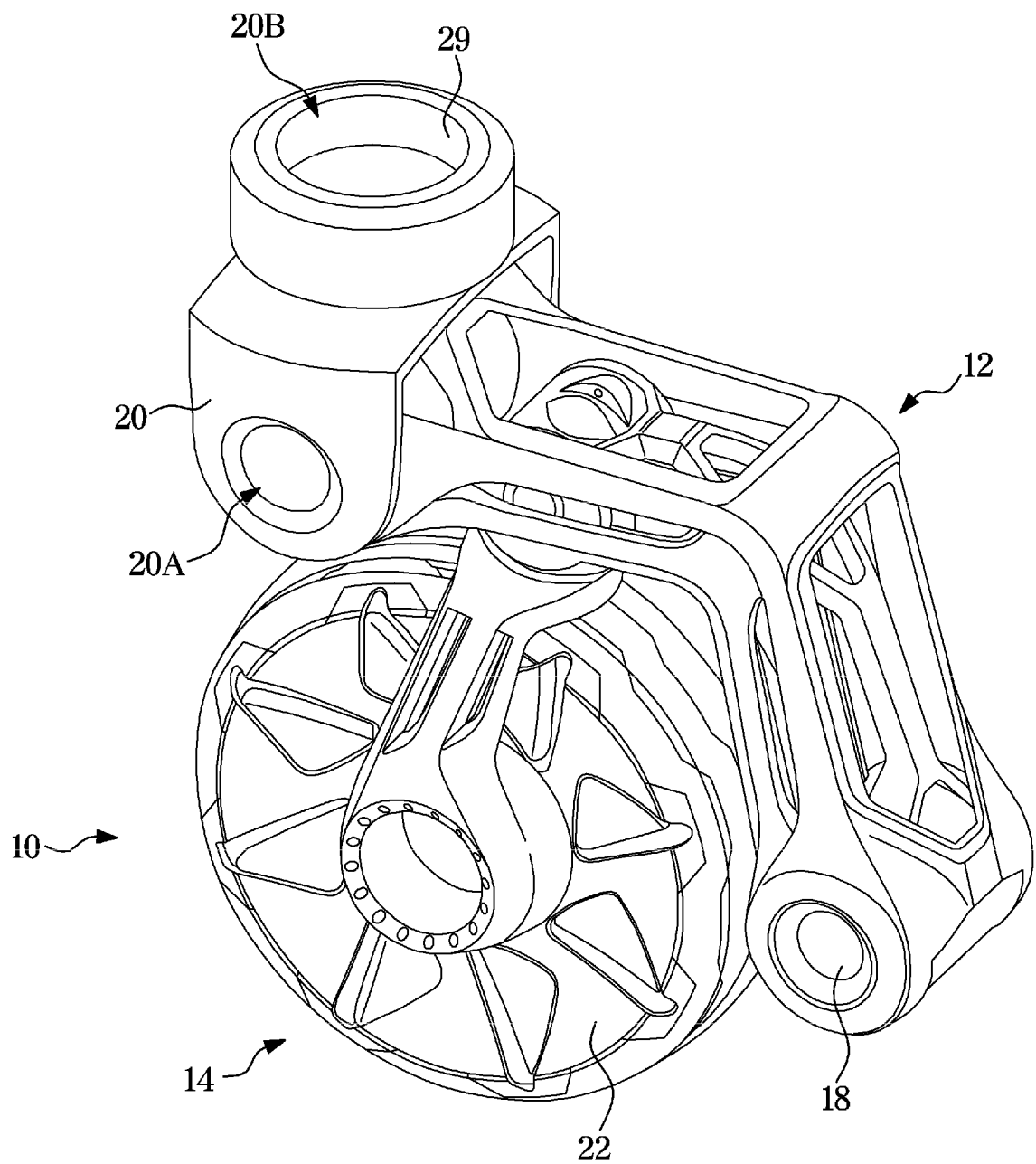
FIGS. 2 and 3 show above views of preferred vehicle traversal components in retracted or stowed configurations.
Figure 3:
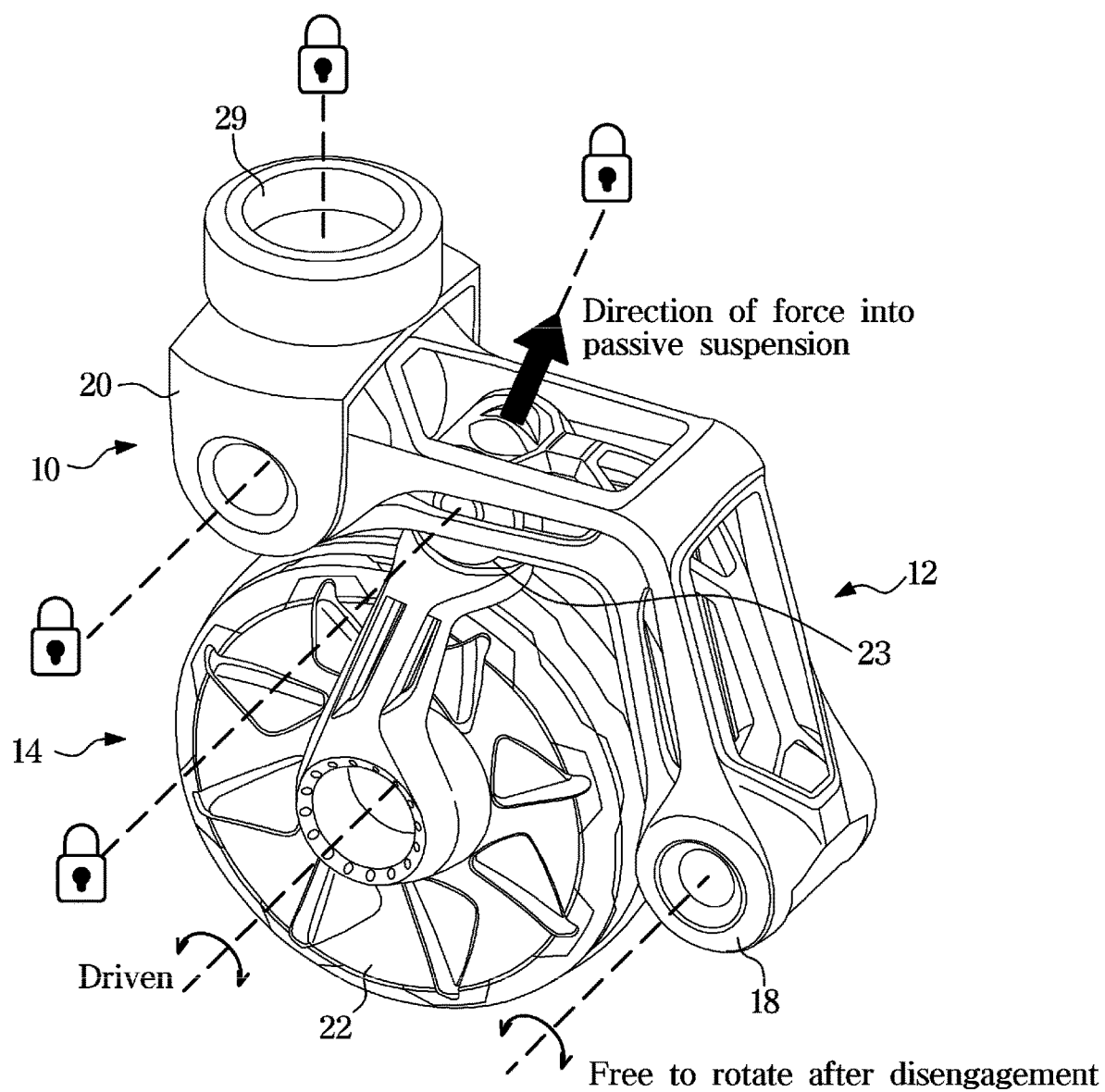

Referring to FIGS. 1-3, vehicle traversal component 10 is shown with leg unit 12 and wheel unit 14. Leg unit 12 includes leg portions 16A and 16B with respective first ends 16A' and 16B' that mate with or otherwise connect (e.g., hinged or other fastening mechanism) to provide knee joint unit 18 and a degree of freedom. A second end 16A" of the first leg portion 16A mates with or otherwise connects to hip portion 20 that includes a hip joint unit and a further degree of freedom. The dimensions of leg portions 16A and 16B suitably can vary widely and may or may not be the same. Thus, the length of leg portion 16A (shortest line as extending between first and second ends 16A' and 16A") and the length of leg portion 16B (shortest line as extending between first and second ends 16B' and 16B") each independently suitably may be up to or at least 0.2, 0.5, 0.8, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, or 5.0 meters.

The hip portion 20 includes hip extension portion 20A and can be coupled to a vehicle chassis via a hip abduction portion 11 that includes mating unit 20B.

Wheel unit 14 includes wheel 22 coupled with wheel joint unit 24 (which unit 24 preferably may include a wheel drive unit) and wheel shaft 26 having a first end 26A mating with the wheel joint unit 24 and a shaft distal or second end 26B mating with second leg portion second end 16B" to form ankle joint unit 28 and provide a degree of freedom. The wheel joint unit 24 and the wheel shaft 26 may form a wheel steering and rotation housing.

Suspension unit 30 is utilized while component 10 is in a retracted or stowed position as generally shown in FIGS. 1-3 for a driving operation and is coupled directly to a vehicle chassis. Notably, the traversal component may have at least two degrees of freedom and in some embodiments, may have at least four degrees of freedom. Preferably, a traversal component 10 has six or at least six degrees of freedom.

In certain preferred systems as generally depicted in FIGS. 1-3, with the traversal component in a retracted configuration that facilitates a driving operation, the leg portions can nest together in an overlapping arrangement. For instance, in the retracted configuration, leg portion 16B can be positioned aside or even nest within or inside of leg portion 16A to provide a more compact arrangement.

In the retracted state, suitably the nested leg portions can at least partially surround a wheel unit 22 as generally depicted in FIG. 1. Thus, as exemplified by FIGS. 1 and 3, the traversal component as extending from knee joint 18 through hip joint unit 20 suitably surrounds at least or up to 10, 15, 20 25, 30, 40 or 50 percent of the circumference of wheel 22.

Also in certain preferred systems as generally depicted in FIGS. 1-3, in a retracted configuration that facilitates a driving operation, the various joint units may be positioned around or aside one of the joints such as the ankle joint unit. Thus, as can be seen in FIG. 1, ankle joint unit 28 is positioned centrally in the retracted traversal component 10 with hip joint unit 20 and knee joint unit 18 positioned on either side of the ankle joint unit 28.

In certain preferred systems, a suspension (e.g. a passive suspension) will be engaged or connected to the traversal component 10 when the traversal component 10 is in a retracted configuration (which facilitates a driving state). In certain preferred systems, a suspension (e.g. passive suspension) may be disconnected to the traversal component 10 when the traversal component 10 is in an extended configuration that facilitates a walking state as generally depicted in FIGS. 5-8. Thus, as shown in FIG. 1, suspension component 30 is engaged with traversal component 10 in the retracted configuration for a driving state, while in FIGS. 5-8 suspension component 30 is disengaged with traversal component 10 in the extended configuration for a walking state.

Figure 4:
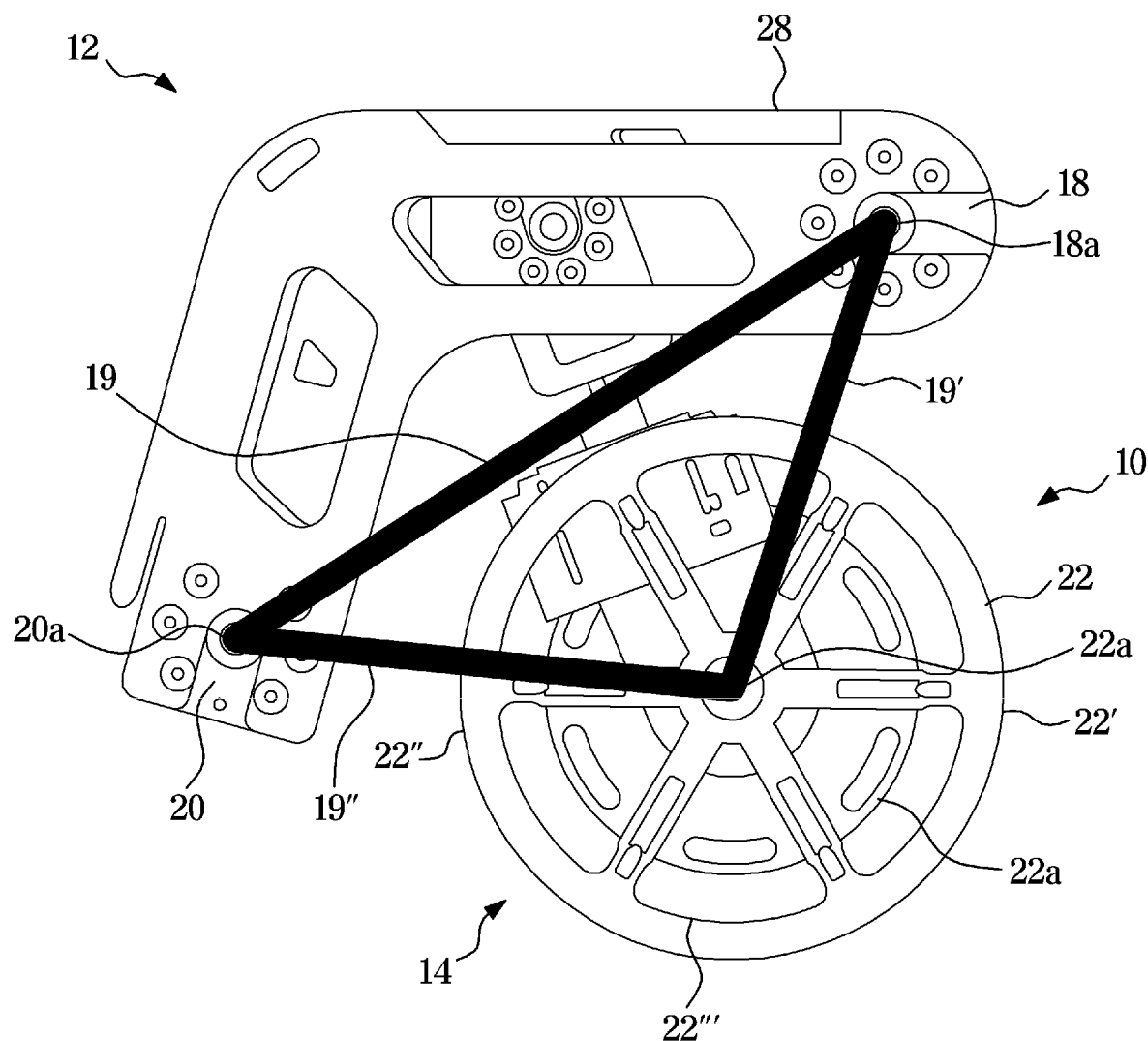
FIG. 4 shows a preferred vehicle traversal component in a retracted configuration.

FIG. 4 illustrates a preferred spatial arrangement between an axis of rotation for the wheel 22, a first hinge joint 22a between the wheel and the leg, and a second hinge joint 20a between the leg and vehicle chassis. Notably, reference numeral 18a shows the center point 18a of the knee joint unit 18.

As further shown in FIG. 4, with the traversal component in a retracted configuration, suitably wheel center point 22a is lower than line 19 between knee and hip joint units 18, 20.

As also shown in FIG. 4, with the traversal component 10 in a retracted configuration, hip joint unit center point 20a can be at the same height as wheel center point 22a (i.e. line 19" shown in FIG. 4 is parallel or approximately parallel (within 0.5, 1, 2, 3, 4, 5, 6, 7, or 8 degrees of parallel) to the ground, or hip joint unit 20a suitably may be up to or at least 1, 2, 3, 4, 5, 6, 7, 8, 9, 10, 12, 14, 16, 18, 20 centimeters higher than wheel center point 22a with the traversal component 10 in a retracted configuration as depicted in FIGS. 1-4.

As discussed, suitably the nested leg portions 16A, 16B partially surround a wheel unit 22 when the traversal unit is in a retracted state as shown in FIG. 4.

In preferred systems, with the traversal or wheel unit in a retracted configuration for a driving state as generally depicted in FIGS. 1-4, the various joint units such as knee joint unit 18, hip joint unit 20, wheel joint unit 24 and ankle joint unit 28 will be locked (preferably, releasably locked) to prevent movement in a Z axis of rotation.

Figure 5:
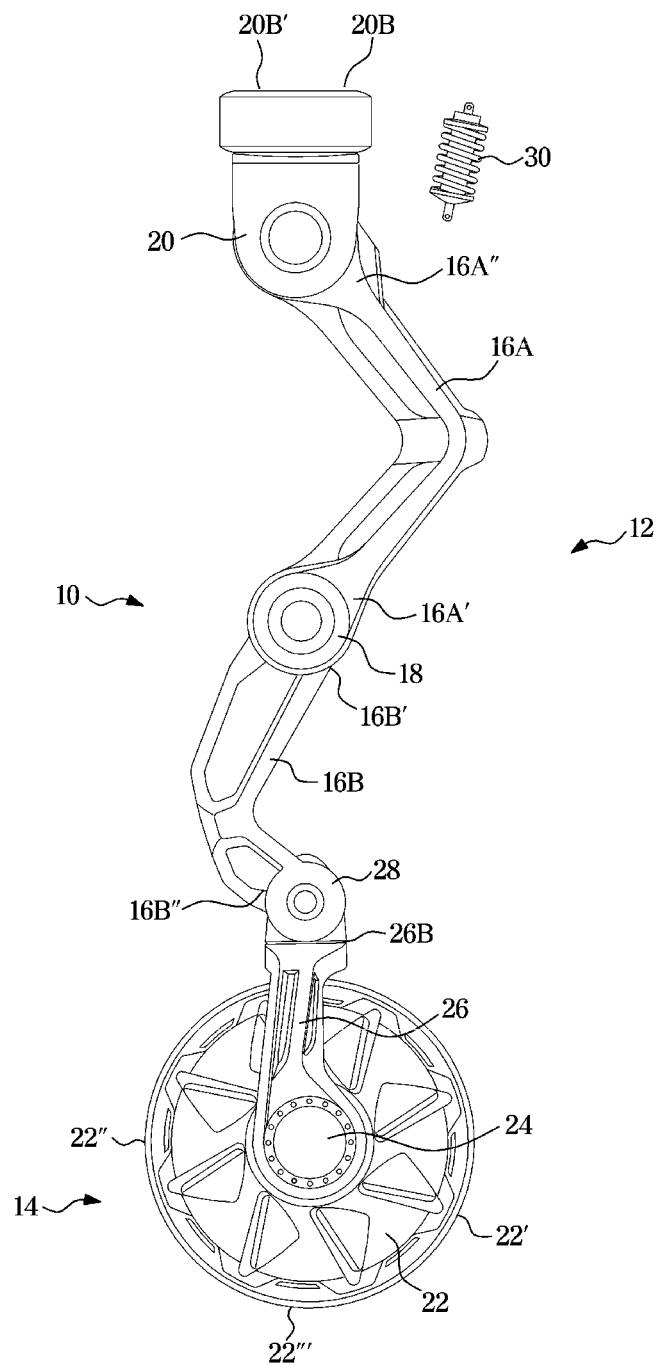
FIG. 5 shows a side of a preferred vehicle traversal component in an actuated configuration.
Figure 6:
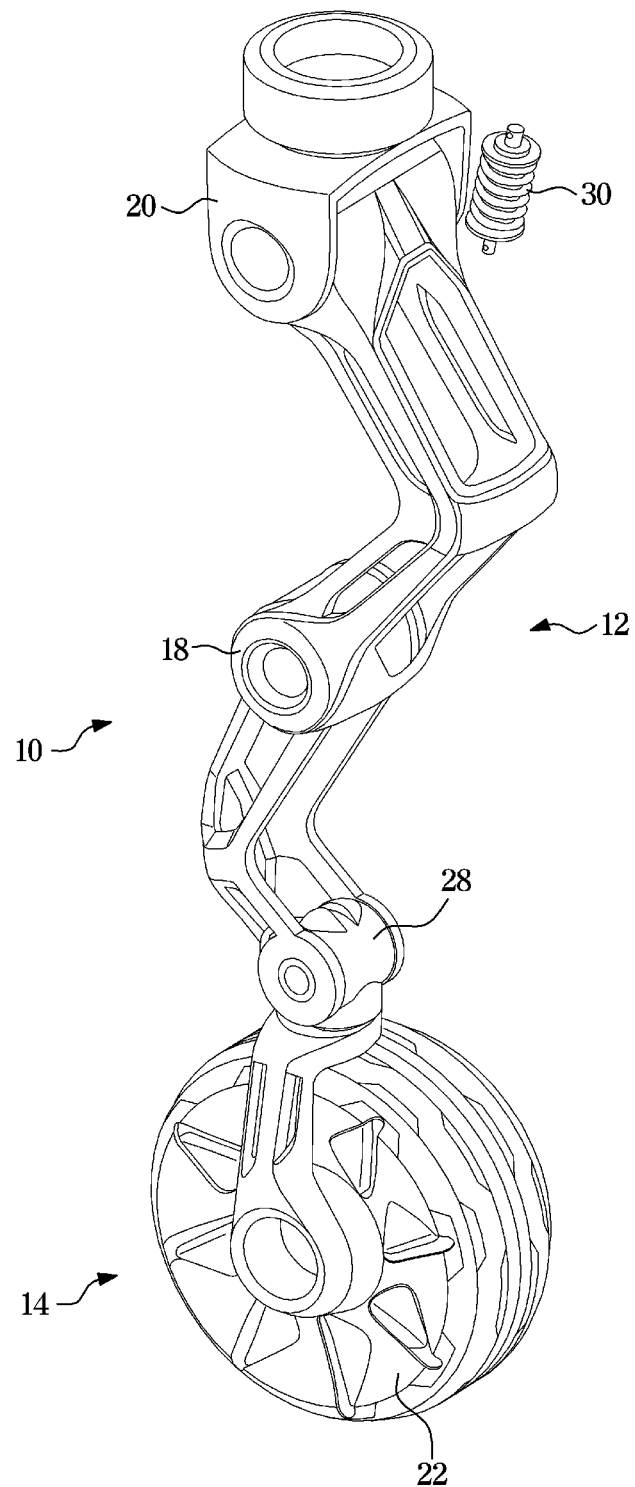
FIGS. 6-7 show above views of preferred vehicle traversal components in actuated configurations.
Figure 7:
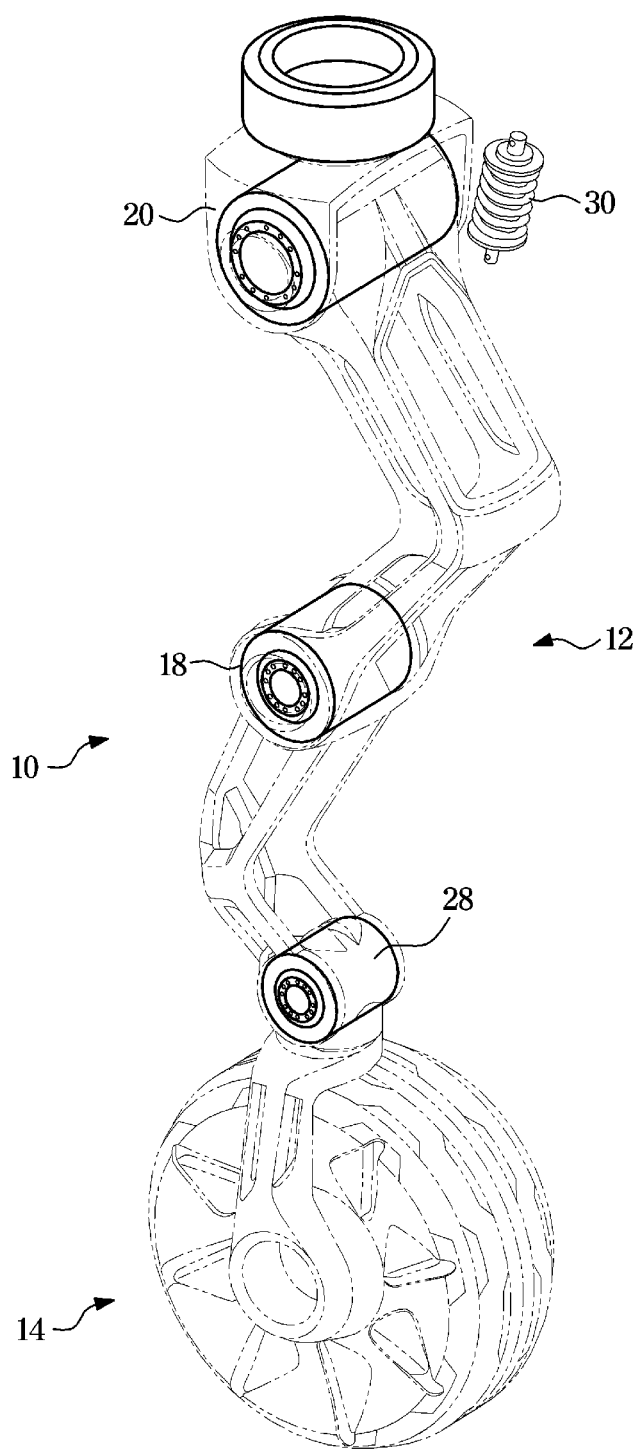

FIGS. 5-7 depict traversal component 10 in an actuated or extended configuration for a walking state of motion.

As can be seen in FIG. 5, leg portions 16A and 16B preferably have a curved or non-linear shape along the longest dimension or length in the extended configuration depicted in FIG. 5. Suitably, the overall curvature of leg portion 16A and/or 16B will be at an obtuse angle (i.e. between 90 and 180 degrees).

As can be seen in FIGS. 5-8, in certain preferred systems, the various joint units (e.g. ankle joint unit, knee joint unit and hip joint unit) are not aligned in the same longitudinal (vertical) plane, but rather one or more of the joint units are advanced ahead of one or more of the other joint units. Thus, as shown in FIG. 5, ankle unit 28 protrudes forward of both knee unit 18 and hip joint unit 20 whereby ankle unit 28 is closer to the vertical plane defined by wheel front edge 22' relative to knee joint 18 and hip joint unit 20.

In preferred systems, with the traversal or wheel unit 10 in an extended configuration for a walking state as generally depicted in FIGS. 5-8, the wheel joint unit 24 may be in a locked (preferably, releasably locked) state to prevent Z axis rotation and to thereby facilitate walking of a vehicle. With the traversal or wheel unit in an extended configuration for a walking state as generally depicted in FIGS. 5-8, one or more other joint units, such as knee joint unit 18, hip joint unit 20, and ankle joint unit 28 may be unlocked to enable movement in a Z axis of rotation and thereby facilitate walking of a vehicle.

In preferred systems, knee joint unit 18, hip joint unit 20 and wheel joint unit 24 have a Z axis of rotation; hip adduction joint unit 29 has a Y axis of rotation; and ankle joint unit 28 preferably has both a Y axis and Z axis of rotation.

As discussed above, in preferred systems, one or both of leg portions 16A and 16B are curved. In particularly preferred systems, a traversal component 10 will be configured whereby both leg portions are curved and when in an extended arrangement as generally depicted in FIGS. 5-8 the leg portions curve outwardly in opposed respective directions. That is, as shown in FIG. 5, leg portion 16A curves toward wheel front edge 22' and leg portion 16B curves in an opposed direction toward wheel back edge 22".

Figure 8:
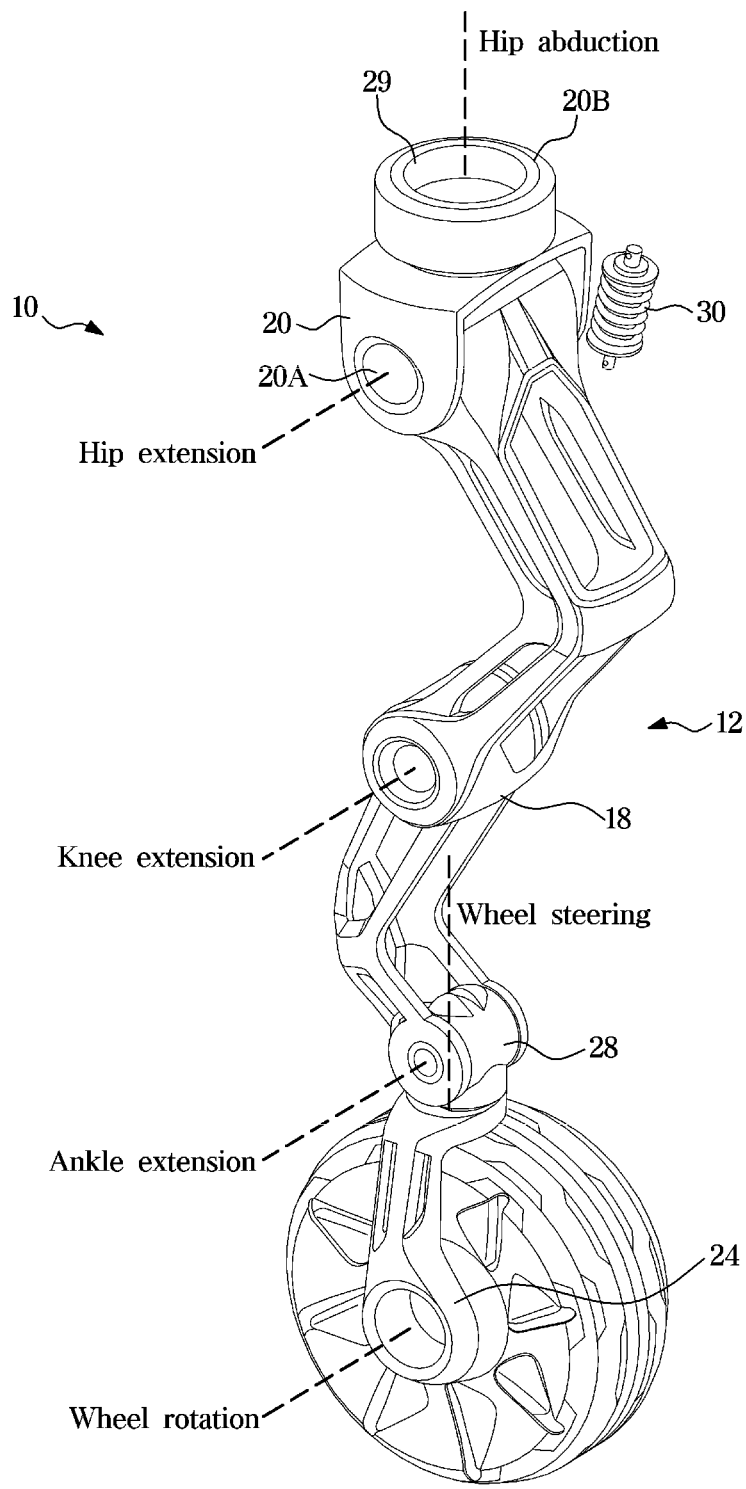
FIG. 8 shows the axes for degrees of freedom of the traversal component.

FIG. 8 shows the axes of the degrees of freedom of a preferred traversal component 10. Thus, as discussed, hip portion 20 includes hip extension portion 20A and can be coupled to a vehicle chassis via a hip abduction portion 11 that includes mating unit 20B. Knee joint 18 can provide rotation shown as knee extension in FIG. 8. Ankle joint unit 28 can provide ankle extension and in certain embodiments wheel steering as depicted in FIG. 8, and wheel unit 14 can provide wheel rotation and in certain embodiments wheel steering as shown again in FIG. 8.

As discussed, the traversal component 10 may switch between a driving mode and a walking mode. In the driving mode, each traversal component 10 may be in a stowed or crouched position where the leg unit is collapsed or retracted. When it is necessary for a vehicle to traverse over a widely varying terrain (e.g., rocky hill, stairs, or similar), the vehicle is capable of switching to a walking mode in which one or more and preferably each traversal component of the vehicle preferably extends and preferably operates independently of each other.

Figure 10:
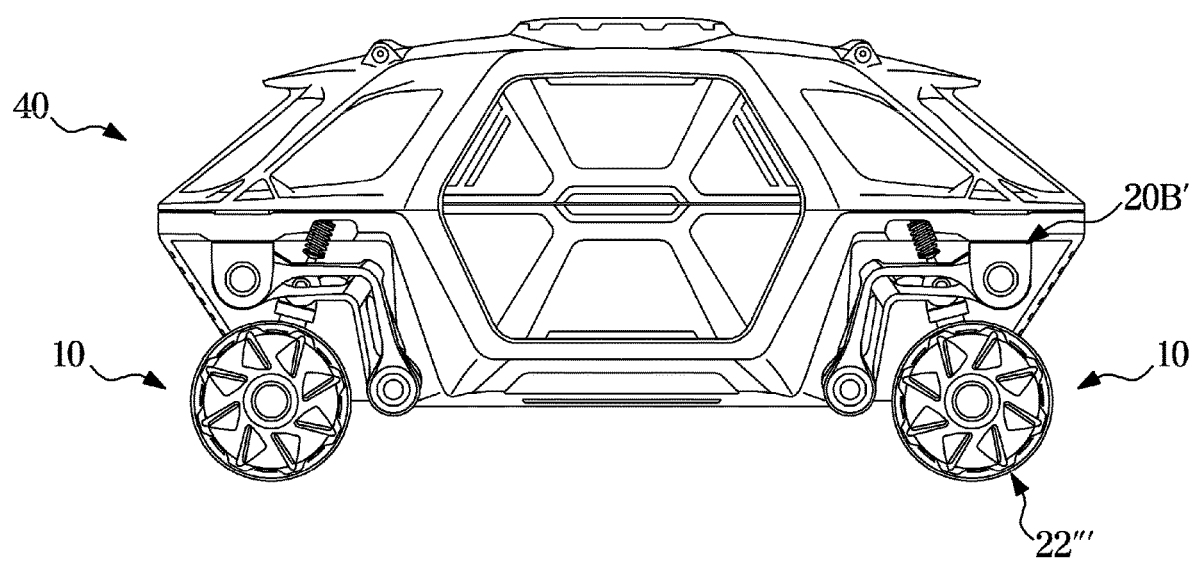
FIG. 10 shows a vehicle with traversal components in retracted or driving configurations.
Figure 11:
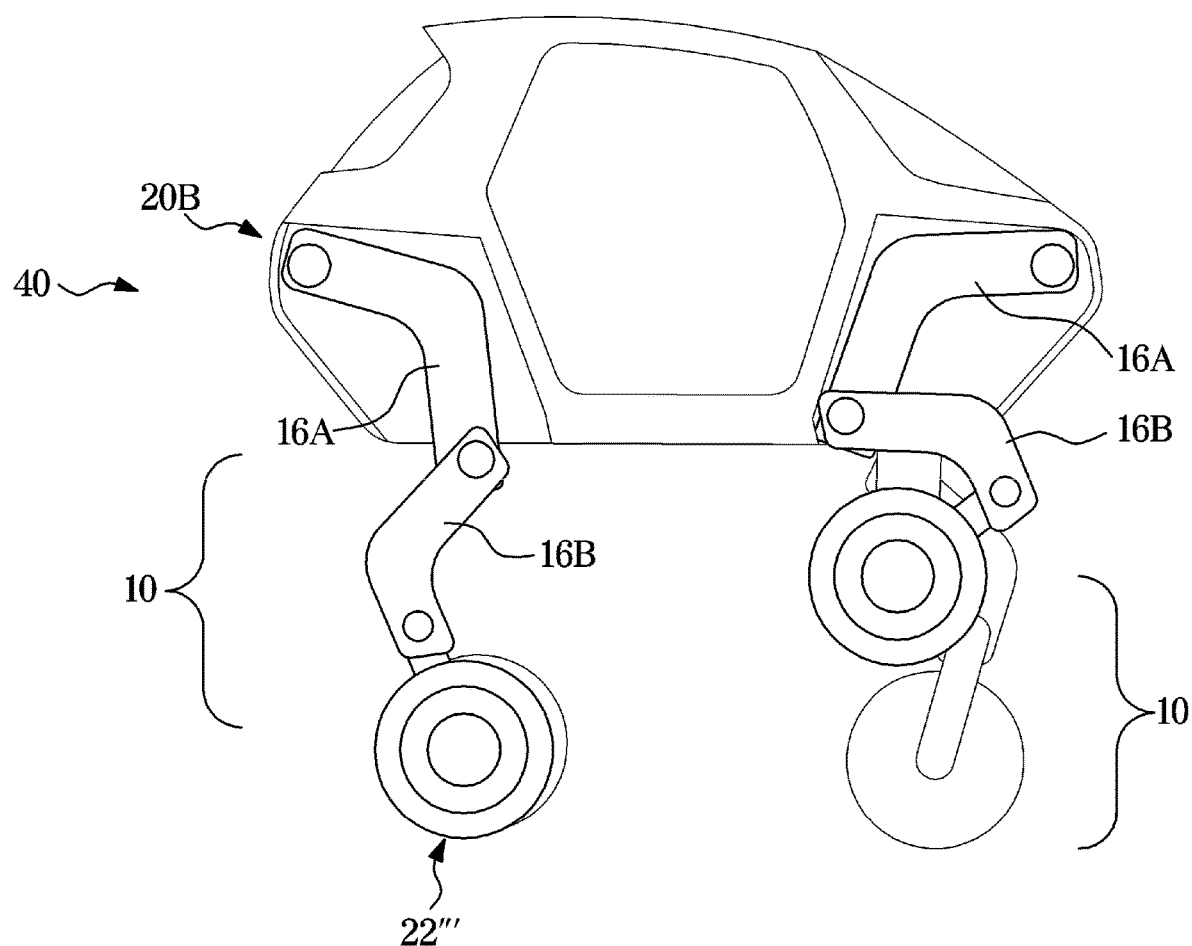
FIG. 11 shows a vehicle with traversal components in actuated or walking configurations.

The height of a traversal component 10 in a walking state (e.g. as shown in FIGS. 5 and 11) relative to the height of the traversal component in the comparatively compact driving state (e.g. as shown in FIGS. 1 and 10) can suitably widely vary. For instance, the height of a traversal component 10 (where the height can be defined as the shortest vertical line extending from hip portion top edge 20B' to the ground that contacts wheel bottom edge 22''' as shown in FIGS. 1 and 5) in an extended configuration as exemplified in FIGS. 5 and 11 may be up to or at least 1.2, 1.3, 1.4, 1.5, 1.6, 1.7, 1.8, 1.9, 2.0, 2.2, 2.4, 2.6, 2.8, 3.0, 3.4, 3.4, 3.6, 3.8, 4.0, 4.2, 4.4, 4.6, 4.8, 5.0, 6.0, 7.0, 8.0, 9.0, or 10.0 times the height (again, where the height can be defined as the shortest vertical line extending from hip portion top edge 20B' to the ground that contacts wheel bottom edge 22''' as shown in FIGS. 1 and 5) in a retracted configuration as exemplified in FIGS. 1 and 10.

For operation of a traversal component 10, one or more suitable power units may be utilized, for example, a continuous motion direct current (DC) motor that drives each degree of freedom, one of which suitably mounts directly to the vehicle chassis. A passive coil-over suspension 30 may also be utilized that suitably mounts directly to the vehicle chassis. A receiver may be included and may be positioned in the wheel rotation and steering housing (24 and 26) with which a latch engages and disengages. A latch can be used to enable housing engagement and disengagement with the passive suspension.

A clutch preferably resides at knee joint 18. When power is supplied to the clutch an armature engages a magnet, which then creates an engagement of the motor at the knee joint 18 with the leg portions. This configuration will be described further herein below.

In a preferred system, upon removing power from the clutch, a flat spring draws the clutch rotor/armature away from the magnet, creating an air gap, which causes disengagement of the motor at the knee joint with the leg portions. In a particularly preferred system, the clutch includes a bearing surface that keeps the first and second leg portions concentric at the knee joint when they are disengaged from each other.

In preferred systems, wheel 22 may be configured such that the rotor of a motor positioned within wheel hub 24 may be installed to an internal surface of the wheel. Suitably, the stator of the wheel hub motor attaches to the ankle joint unit 28.

In preferred systems, with the exception of the motor at the knee extension, motor stators are attached to the adjacent structure furthest from the wheel, while the motor rotors are attached to the adjacent structure closest to the wheel (or the wheel itself).

Figure 9:
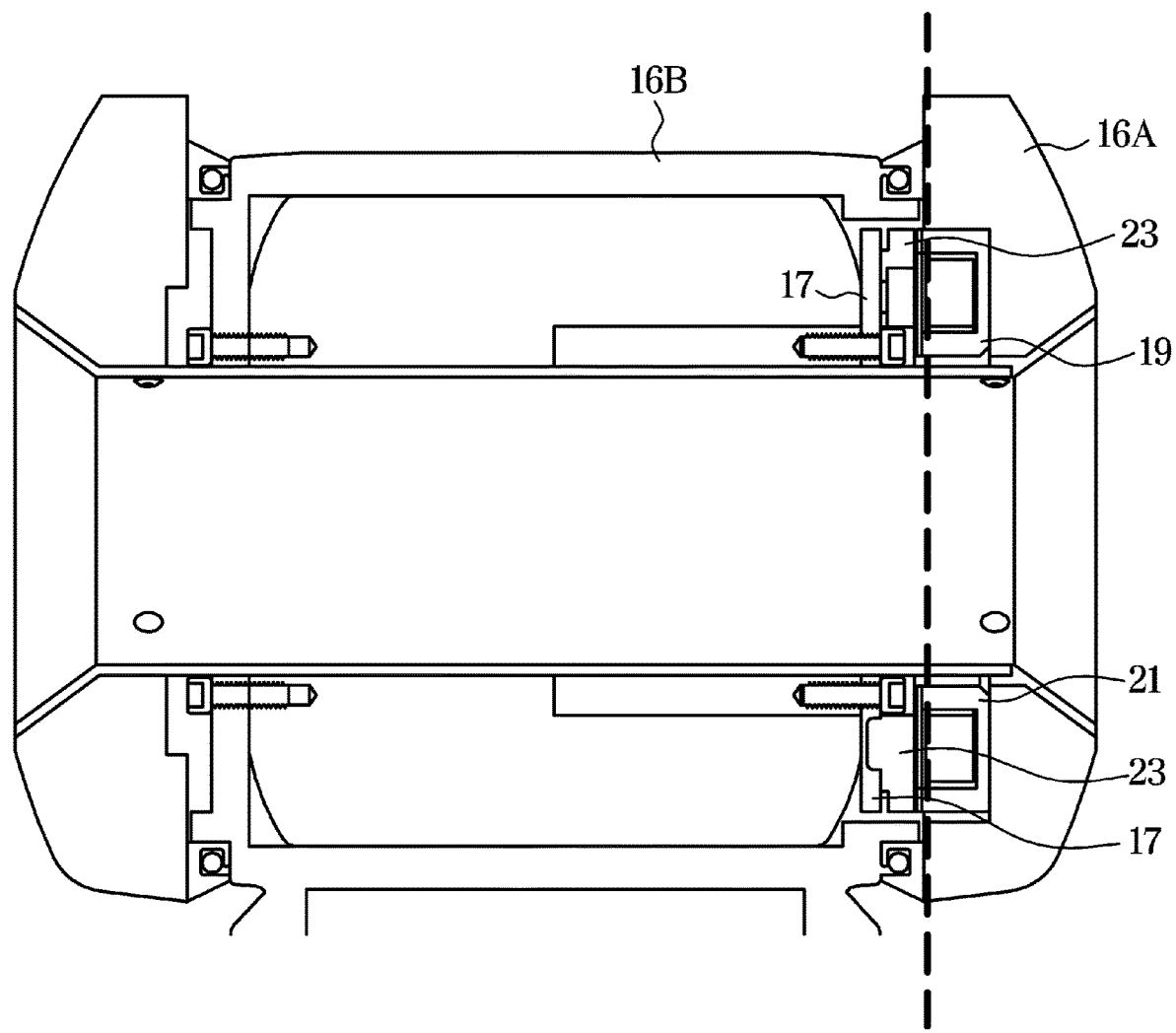
FIG. 9 depicts a cross-section view of interface between leg portions together with clutch components.

FIG. 9 shows a preferred system in cross-section with leg portions 16A and 16B, clutch hub 17, magnet 21 and armature 23. To engage and disengage, the armature 23 moves toward and away from the clutch hub 17 perpendicular to the hashed vertical line. In other words, to transition between a driving mode or state and a walking mode or state, the clutch and disengages with the leg portions via the armature and the magnet. The transition between the modes will be described further herein below.

FIG. 10 shows vehicle 40 in a driving state where each traversal components 10 has leg portions in a stowed or crouched configuration. That is, the leg portions in the driving state are nested against the vehicle body to provide an overall compact configuration. In FIG. 11, vehicle 40 is depicted in a walking state with transversal components 10 in an actuated state with leg portions 16A and 16B extended vertically while a knee extension motor is engaged with at least one of the leg portions. As shown, each traversal component 10 is capable of extending independently of each other. For example, as shown, each of the front traversal components may be extended at different lengths to accommodate stepping over a heightened or uneven terrain. An example of heightened terrain may include when the vehicle is required to climb a step or walk over a rock or other similar object. As the extension of the leg units of the traversal component changes, high gear ratios may be used at each degree of freedom to hold a particular position.

In one preferred configuration, to move from driving mode to walking mode, the following can occur with each traversal component 10. The passive suspension disengages from its receiver such as through action of a latch. A clutch unit engages a motor at the knee extension or joint unit with a leg portion. Motors at one or more joint unit (e.g. hip, ankle) activate to position the leg portions in extended, articulated positions such as depicted in FIGS. 5-8 suitable for a walking mode.

To change from walking mode to driving mode, the following can occur with each traversal component 10. The motors at each joint activate to move the leg to the desired driving position. The latch engages the passive suspension with its receiver. The clutch disengages the motor at the knee joint unit.

In addition to the separable passive suspension, a vehicle is capable of active suspension for the chassis in slower travel modes. In one suitable arrangement for this suspension, a sensor configured to output the configuration of the chassis and each of the leg units react accordingly, adjusting the distance of the wheel from the hip abduction motor to maintain the chassis level and at a set height as the vehicle rolls over an object. The adjustment of distance is achieved through the change of position at the hip and knee units degrees of freedom.

A traversal component arranged in a stowed position (e.g. with leg portions positioned as generally shown in FIGS. 1-4 and 10) is capable of maintaining a slight angle of the wheel steering axis to the ground. Such nesting of leg portions in a stowed arrangement allows for packaging within a chassis that is of comparable sizing to currently available passenger vehicles. The angle of wheel steering axis to the ground also can create a positive caster angle, which improves driving stability and handling through turning of the vehicle.

In certain preferred aspects, a traversal component as disclosed herein arranged in a stowed position such as exemplified in FIGS. 1-4 and 10 can provide disengaging a knee unit motor stator from the second leg portion, allowing loads to be taken up by a passive suspension instead of by the gearboxes while in driving mode.

In additional preferred aspects, a traversal component as disclosed herein in either a retracted or stowed (driving state) or actuated (walking state) configuration with a knee unit motor engaged with a leg portion can provide an active suspension, for example adjusting to the height of the terrain or an elevated position as desired.

What is claimed is:

1. A vehicle, comprising;
a plurality of vehicle traversal components,
a receiver mounted with a wheel rotation and steering housing; and
a latch that engages with the receiver to engage a passive suspension connected to a chassis of the vehicle;
wherein each vehicle traversal component comprises:
(a) a wheel unit with multiple degrees of freedom, and
(b) a leg unit with multiple degrees of freedom, wherein the leg unit is extendable;
wherein the leg unit includes;
a hip housing.
at least two leg portions, and
the wheel rotation and steering housing.

2. The vehicle of claim 1, wherein the plurality of vehicle traversal components comprise at least four vehicle traversal components.

3. The vehicle of claim 1, wherein the leg units nest in a retracted configuration in a driving state of the vehicle.

4. The vehicle of claim 1, wherein the leg units extend vertically in an actuated configuration in a walking state of the vehicle.

5. The vehicle of claim 1, wherein each degree of freedom of the leg units is driven by a direct current motor.

6. The vehicle of claim 1, further comprising a wheel hub motor installed at an inner surface of the respective wheel units.

7. The vehicle of claim 1, wherein a height of the vehicle is adjustable to a height of terrain on which the vehicle is being driven.

8. The vehicle of claim 1, wherein the degrees of freedom of the vehicle traversal components comprise hip abduction, hip extension, knee extension, ankle extension, wheel steering and wheel rotation.

9. The vehicle of claim 8, wherein a vehicle height is adjusted to the terrain height when a knee extension motor is engaged with one of the at least two leg portions.

10. The vehicle of claim 1, wherein the leg units include:
a knee joint that connect a first leg portion and a second leg portion of the leg units;
a hip portion through which the leg units are coupled to a vehicle chassis; and
an ankle joint unit coupled to the wheel units.

11. The vehicle of claim 10, wherein the wheel units include:
a wheel;
a wheel drive unit; and
a wheel shaft,
wherein a first end of the wheel shaft mates with the drive unit and a second end of the wheel shaft mates with the second leg portion of the leg units.

12. A vehicle comprising a plurality of vehicle traversal components, each vehicle traversal component comprising:
a wheel unit with multiple degrees of freedom;
a leg unit with multiple degrees of freedom, wherein the leg unit is extendable,
wherein a suspension unit is engaged with the vehicle in a driving state and the suspension unit is disengaged with the vehicle in a walking state.

13. The vehicle of claim 12,
wherein a height of the vehicle is adjustable based on extension of the leg unit.

* * * * *